United States Patent
Brandes et al.

(10) Patent No.: US 7,226,129 B2
(45) Date of Patent: Jun. 5, 2007

(54) RELEASE DEVICE FOR A REAR SEAT BACKREST COMPONENT PART OF A VEHICLE

(75) Inventors: Gerd Brandes, Hannover (DE); Markus Kneif, Stadthagen (DE); Michael Steinmetzer, Kobbensen (DE); Rene Kufa, Opava (CZ); David Thomke, Opava (CZ)

(73) Assignees: Faurecia Autositze GmbH & Co. KG (DE); Brano a.s. (CZ)

( * ) Notice: Subject to any disclaimer, the term of this patent is extended or adjusted under 35 U.S.C. 154(b) by 99 days.

(21) Appl. No.: 11/126,720

(22) Filed: May 11, 2005

(65) Prior Publication Data

US 2005/0264043 A1    Dec. 1, 2005

(30) Foreign Application Priority Data

May 12, 2004  (DE)  ...................... 10 2004 023 401

(51) Int. Cl.
*B60N 2/20* (2006.01)
(52) U.S. Cl. .............................. 297/378.13; 297/217.2; 296/65.1; 296/68.1
(58) Field of Classification Search .......... 297/378.13; 292/336.3, DIG. 31; 296/65.01, 65.17, 68.1
See application file for complete search history.

(56) References Cited

U.S. PATENT DOCUMENTS

| | | | | |
|---|---|---|---|---|
| 4,813,722 | A | * | 3/1989 | Viscome et al. ............... 296/63 |
| 5,664,839 | A | * | 9/1997 | Pedronno et al. ...... 297/378.13 |
| 5,700,056 | A | * | 12/1997 | Bernard .................. 297/378.13 |
| 5,762,401 | A | | 6/1998 | Bernard |
| 5,855,414 | A | * | 1/1999 | Daniel et al. ............. 296/65.01 |
| 6,139,076 | A | * | 10/2000 | Hara et al. ................ 292/336.3 |

FOREIGN PATENT DOCUMENTS

| | | |
|---|---|---|
| DE | 199653216 | 6/1998 |
| DE | 19713753 | 10/1998 |
| DE | 19916223 | 2/2001 |
| DE | 10142486 | 3/2003 |
| JP | 9188174 | 7/1997 |

* cited by examiner

*Primary Examiner*—Peter R. Brown
(74) *Attorney, Agent, or Firm*—Synnestvedt Lechner & Woodbridge LLP

(57) ABSTRACT

The invention relates to a release device for a rear seat backrest component part (1) of a vehicle seat, comprising a housing (9) to attach to the foldable rear seat backrest component (1), a handle (16) connected to a transfer means (22) and designed to be actuated by the user, and a warning indicator (20), including an indicator area (36) to indicate the unlocked state of a lock (5) in a pushed-forward position.

In order to ensure good manageability and clearly visible indication of the unlocked position, it is designed that housing (9) has a steering area (12) and warning indicator (20) has a guiding curve (44) for contact to steering area (12); that handle (16) is pivotably mounted in housing (9) and exhibits a guide (19), in which warning indicator (20) is movably guided and preloaded by a spring (38) in an upper position of its displacement path, which position is determined at least in one portion of the pivot area of handle (16) by the contact of guiding curve (44) to steering area (12).

13 Claims, 10 Drawing Sheets

RELEASE DEVICE FOR A REAR SEAT BACKREST COMPONENT PART OF A VEHICLE

CROSS REFERENCE TO RELATED APPLICATIONS

This application claims the priority of German Patent Application 10 2004 023 401.9 filed on May 12, 2004, the entire contents of which is hereby incorporated in total by reference.

BACKGROUND OF THE INVENTION

1. Field of the Invention.

The invention relates to a release device for a rear seat backrest component part of a vehicle.

2. Description of Related Art.

A release device of such type is known from DE 197 13 753 C2, wherein the lock which locks the rear seat backrest component to the chassis is released by the user by means of an actuating button, which then allows the rear seat backrest component to be folded down.

When the rear seat backrest component is folded up, it generally locks the lock, designed e.g. as a rotary latch lock, automatically to the chassis. But in the event that such locking is not effected completely and the user does not notice the failed locking operation, the rear seat backrest component, by folding downward, can subject the user to an increased risk of injury in the event of a crash when the seat is subsequently used. For this reason, warning indicators are often provided to signal incomplete or failed locking. In DE 197 13 753 C2, the actuating button provided for release purposes is functionally linked to an indicator in such a way that the latter is moved between an invisible position in the locked state and a visible position in the unlocked state.

JP 09 188 174-A also describes a release device having a release button with a warning indicator. This warning indicator is rotatable about a transverse axis and interlinked with a holding element via a connecting link.

DE 199 16 223 C1 describes a release device for a foldable rear seat backrest of the rear seat of a motor vehicle, featuring a pivotable handle as a release solution, wherein handle actuates a locking element via a transfer element by means of a driving mechanism.

DE 101 42 486 A1 shows a lock to fasten the rear seat backrest of a motor vehicle to the body by means of a latch bolt that is held in the locked position by means of a pawl, said pawl being actuated by means of a transfer bar which is attached to a rear lever arm of an actuator actuated by the user. In addition, an indicator element is provided in a spring-preloaded manner within a longitudinal groove on the rear lever arm, with said indicator element, upon rotation of the actuator, being pushed out of a housing-fixed guide and with the indicator element, upon loading, remaining in the longitudinal hole under spring tension.

DE 196 53 216 A1 shows a release device with a locking indicator for a movable element of a motor vehicle seat, wherein a pivotable lever is moved, with said lever having a tongue which is visible in an opening of the cover and which exhibits, depending on its position, a similar color as the one of the cover or a glaring color contrasting with the cover.

SUMMARY OF THE INVENTION

The invention is based on the technical problem of creating a release device for a rear seat backrest component of a vehicle which ensures good manageability and a safe and clearly visible indication of the unlocked position.

This problem is solved by a release device.

The release device according to the invention thus exhibits three essential structural components: a housing; a handle which is pivotable within said housing, and a warning indicator movably guided on the handle. The rotatable handle according to the invention is more user-friendly than the conventional actuating buttons.

The warning indicator is movably guided within a guide of the handle and spring-preloaded in an uppermost position. The uppermost position is defined by the contact of a guiding curve of the warning indicator in a steering area, e.g. a transversally extending steering pin.

Thus, according to the invention, the change in the relative position of the pivotable handle vis-à-vis the housing is utilized to move a warning indicator guided on the handle. When the handle is rotated forward, the displacement path of the warning indicator is released in the guide of the handle, causing the warning indicator to be pushed further upward by the spring action and allowing the warning indicator to emerge behind the handle element. The warning indicator exhibits a substantial indicator area, e.g. with a red color, which signals the unlocked state directly to the user as a "red flag" or warning sign and which is capable of being designed Larger and more substantial as compared to conventional indicators. A simple and cost-effective construction of the release device according to the invention is achieved by manufacturing the warning indicator as a complete component from a different-colored plastic than the color of the material used for the handle and the housing.

By providing a guiding curve on each side of the warning indicator, a stable, tilt-resistant design of the release device is achieved, with only one single spring being sufficient for the preloading of the warning indicator in the guide of the handle.

In the frontmost area of the length of the path of the handle, the guiding curve of the warning indicator can lose contact with the steering area as soon as the warning indicator reaches the upper stop of the guide of the handle.

These and other features of the invention will be more fully understood by reference to the following drawings.

DETAILED DESCRIPTION OF THE INVENTION

During the course of this description, like numbers will be used to identify like elements according to the different views that illustrate the invention.

Figure 1:
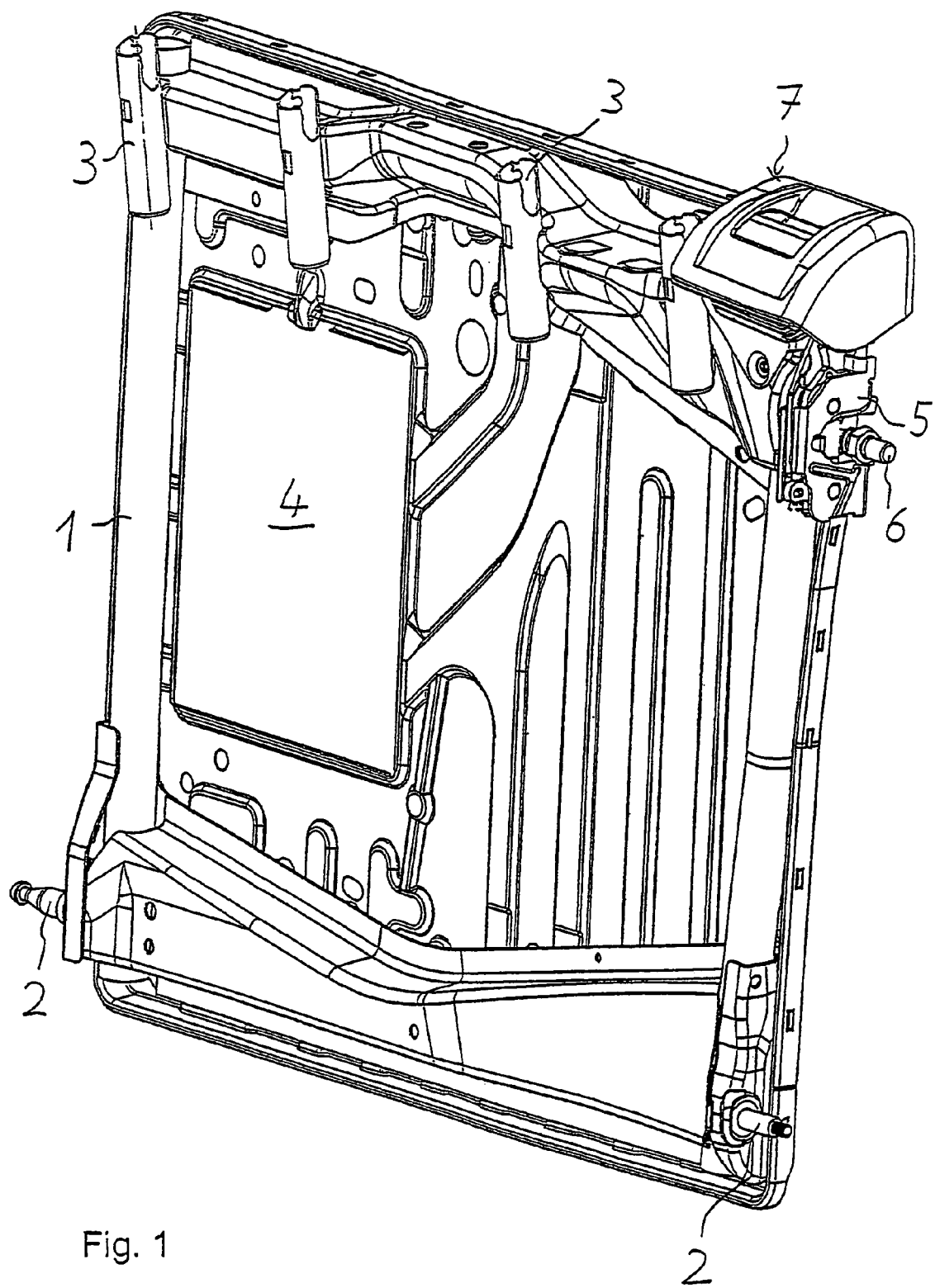
FIG. 1 is a perspective view from the front of a rear seat backrest component of a motor vehicle with a lock and the release device according to the invention.

A rear seat backrest component 1, of which merely the frame is shown in FIG. 1, extends over 60% of the width of the entire, not shown rear seat backrest of a motor vehicle and is mounted in an axis of rotation 2 in such a manner that it is capable of being folded forward. On the rear seat backrest component 1, receptacles for head rest bars 3 and a pass-through opening 4 are provided; they will not be further discussed here. The rear seat backrest component 1 further exhibits a lock 5, e.g. a rotary latch lock 5, which, in the upright position shown, locks a chassis-fixed bolt 6 and which is unlocked by the user via a release device 7 for the purpose of folding down the rear seat backrest component 1.

The release device 7 exhibits a housing 9, which is attached to the frame of the rear seat backrest component 1 via the screw openings 8, said housing 9 being provided with a recess 10 and a steering pin 12 extending in the transverse direction and serving as the steering area according to the invention. A handle 16 with a recessed grip 18 is mounted to the housing 9 via a pivot axis bolt 14 and exhibits guide grooves 19 on its sides, on which a warning indicator 20 is movably guided. Furthermore, a transfer bar 22 is linked to handle 16 in a link 49, with said transfer bar 22 connecting the release device 7 with the rotary latch lock 5.

Figure 3:
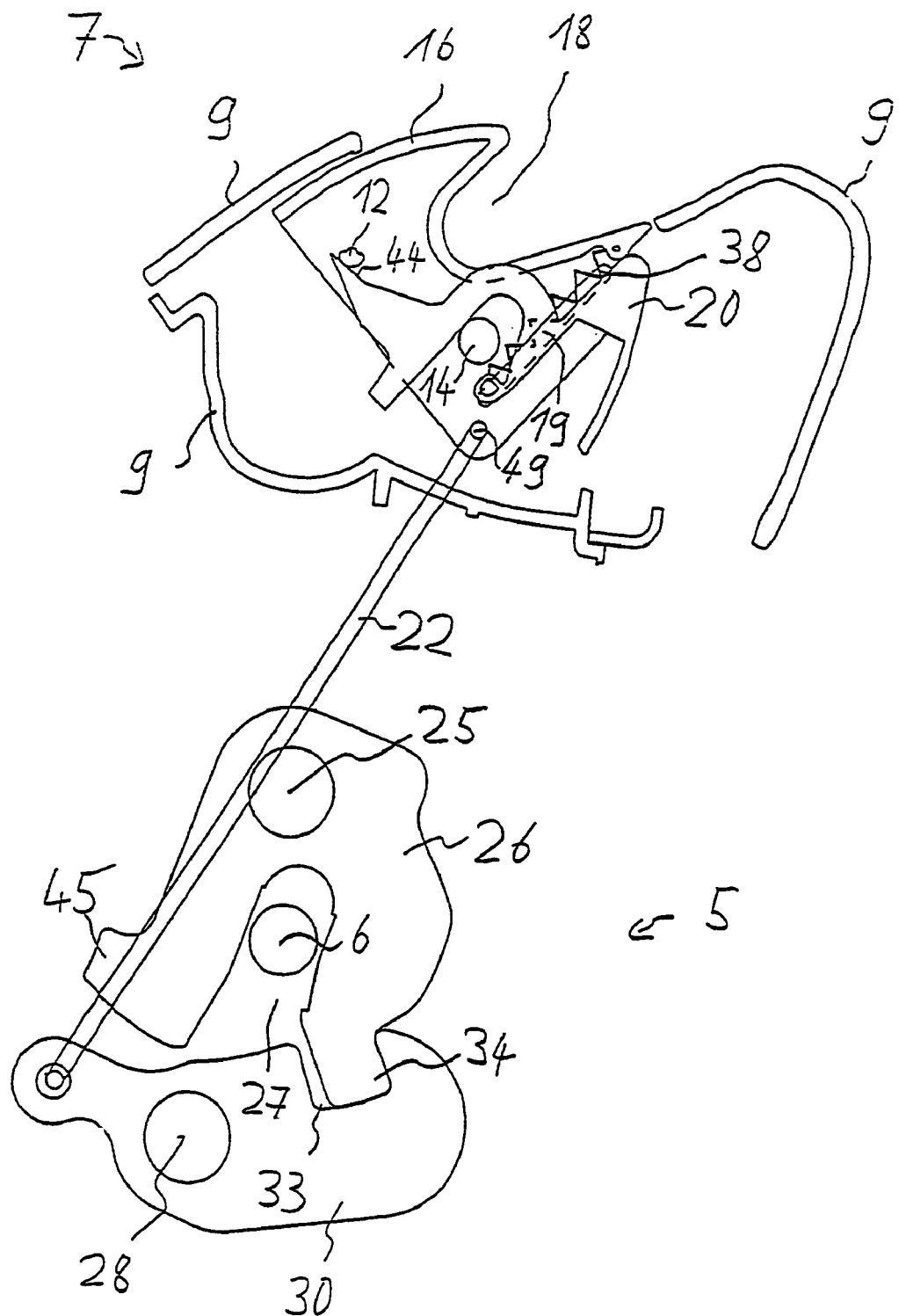
FIG. 3 is a longitudinal section through the configuration in FIG. 2.
Figure 7:
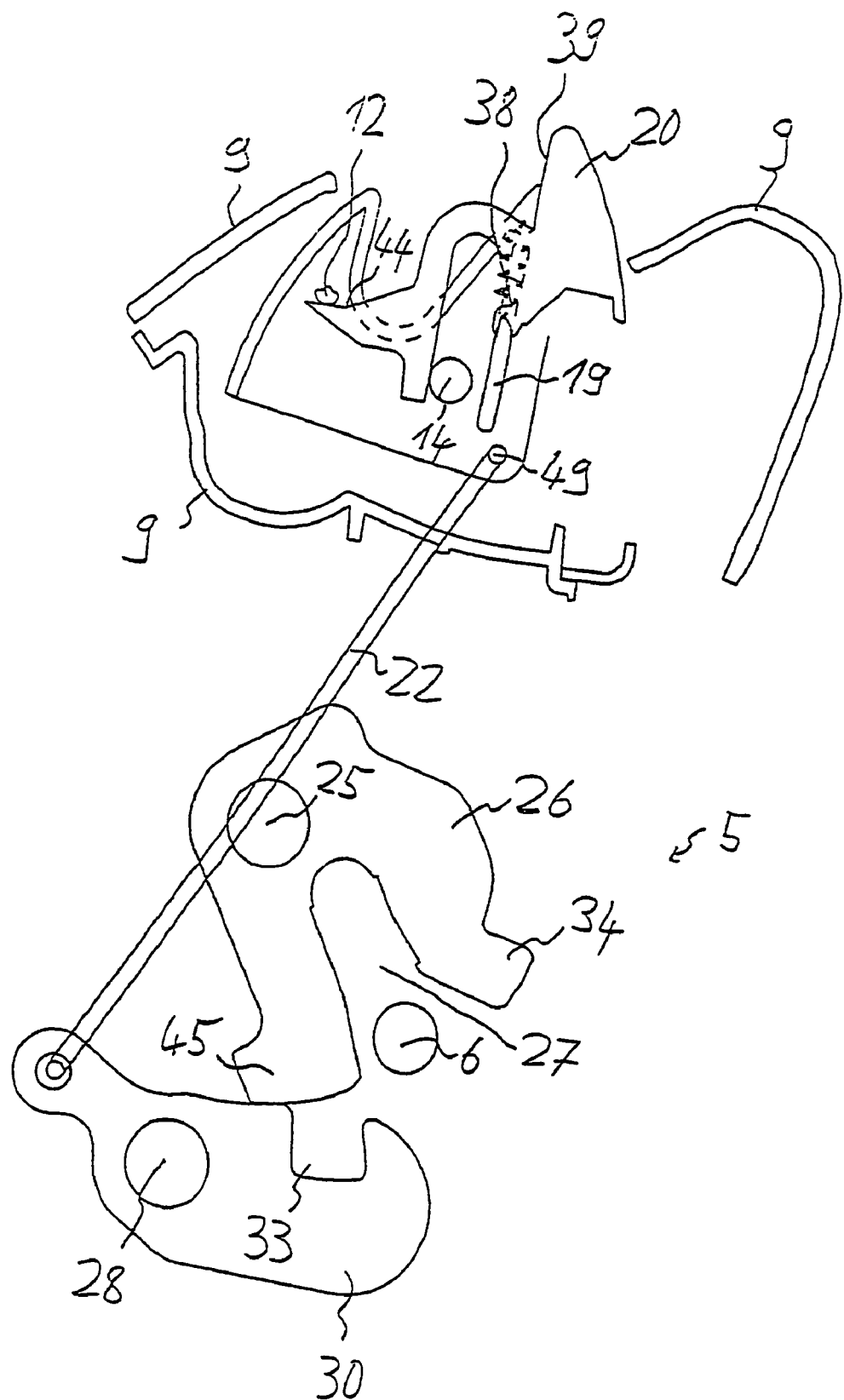
FIG. 7 is a longitudinal section through the configuration in FIG. 6.
Figure 8:
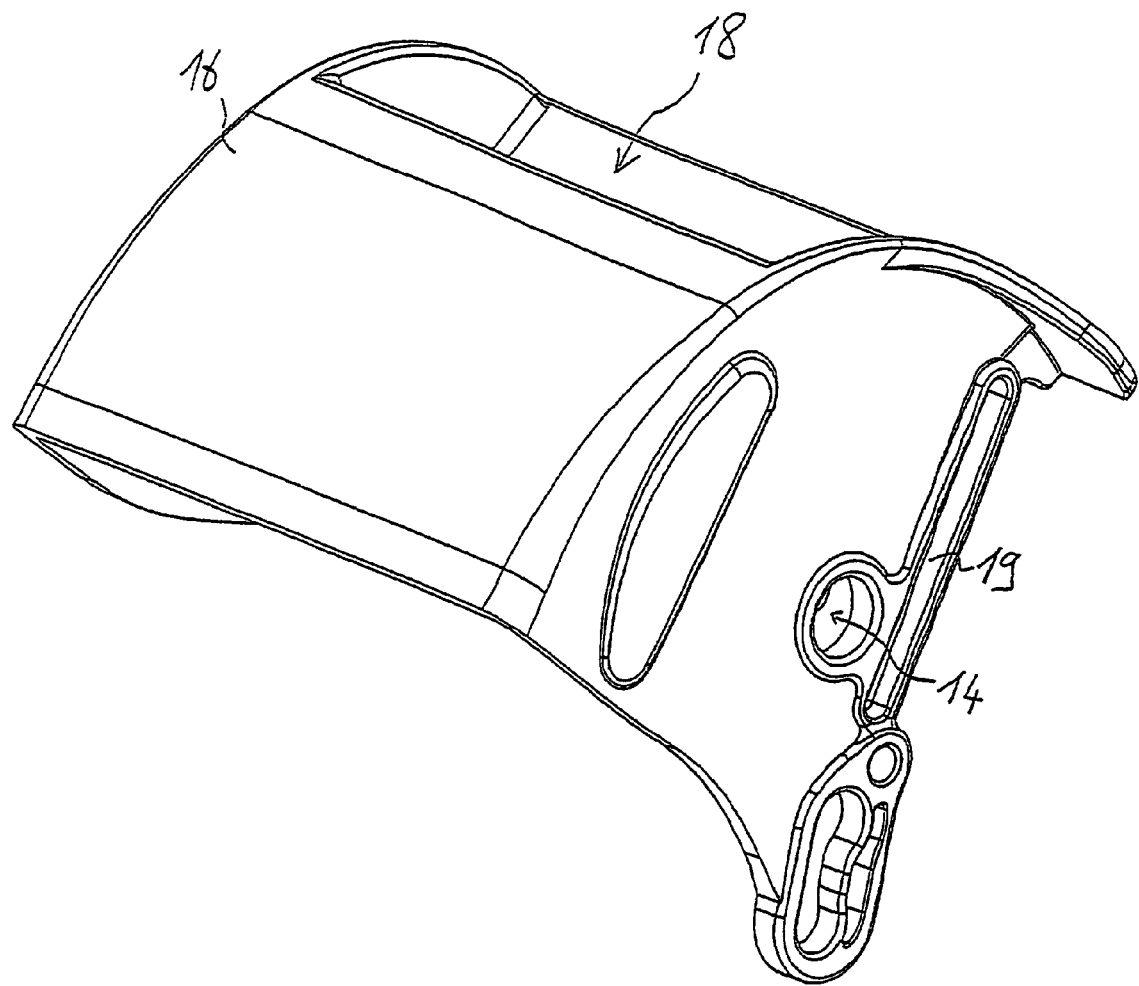
FIG. 8 is a perspective view of the handle.

The rotary latch lock 5 exhibits a rotary latch 26, which is linked to rear seat backrest component 1 in a pivot axis 25 and exhibits a mouth 27, as well as a pawl 30, which is linked to the rear seat backrest component 1 in a pivot axis 28. The spring-preloaded rotary latch 26, shown in its open position in FIG. 7, catches the chassis-fixed bolt 6 in its mouth 27 and is locked by the pawl 30, as shown in FIG. 3, in that the pawl 30 receives a leg 34 of the rotary latch 26 in its recess and blocks it as a result of its spring preloading. On actuation of handle 16, the pawl 30 with its cutout 33 is pivoted against the spring which pre-loads via transfer bar 22, thereby releasing leg 34 of rotary latch 26. When, subsequently, the rear seat backrest component 1 is folded forward, the chassis-fixed bolt 6 is moved out of rotary latch 26, as shown in FIG. 7.

The warning indicator 20 is made out of a red plastic material and exhibits an indicator area 36 or tongue serving as a warning means which is visually set off from the housing 6 and handle 16, which are made from a different color plastic material, e.g. black or gray. The warning indicator 20 is movably guided in handle 16, capable of a one-dimensional movement, and pre-loaded upwards by means of a tension spring 38, which is attached to warning indicator 20 at its bottom end and attached to handle 16 at its top end.

Figure 5:
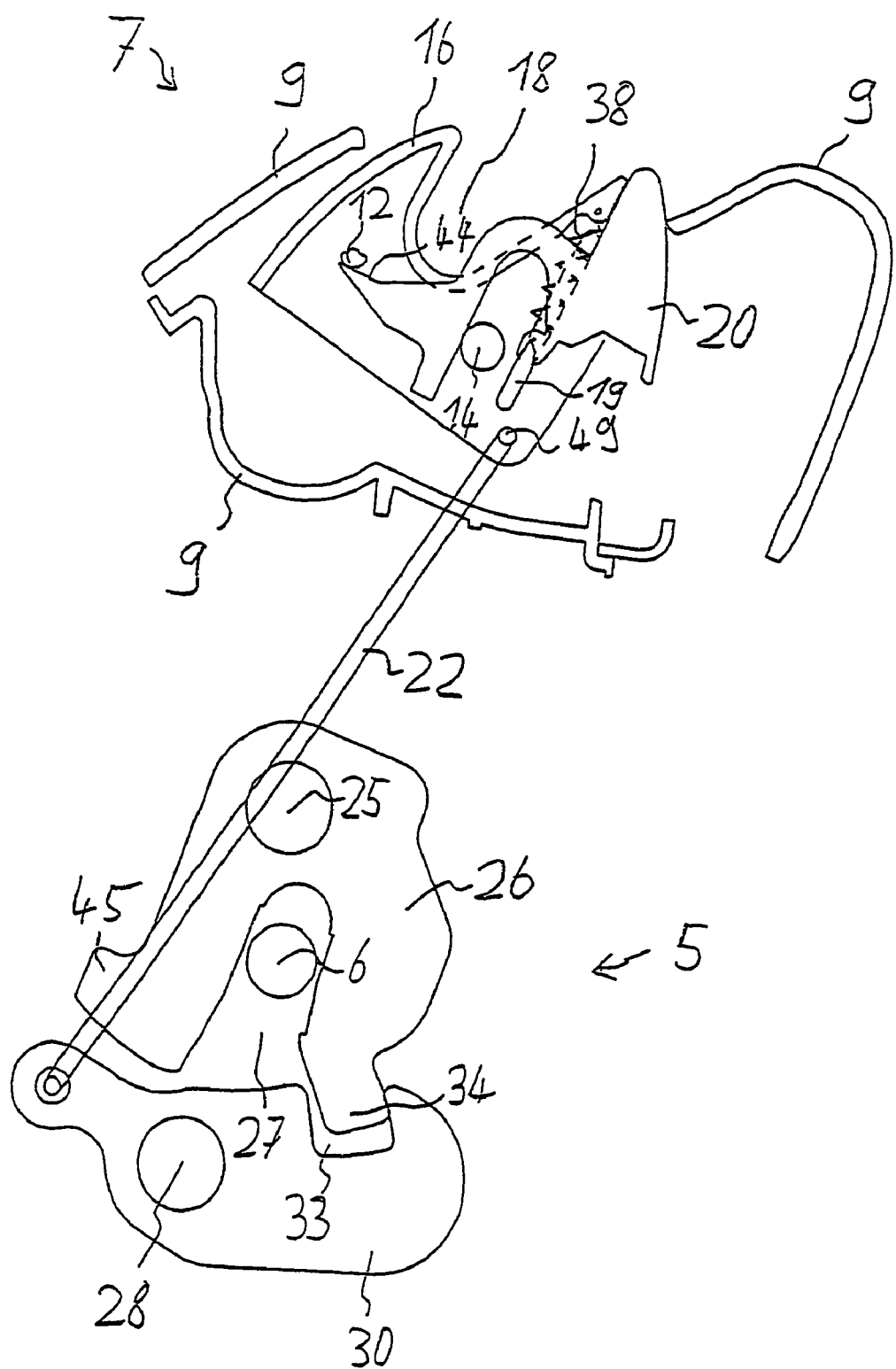
FIG. 5 is a longitudinal section through the configuration in FIG. 4.
Figure 6:
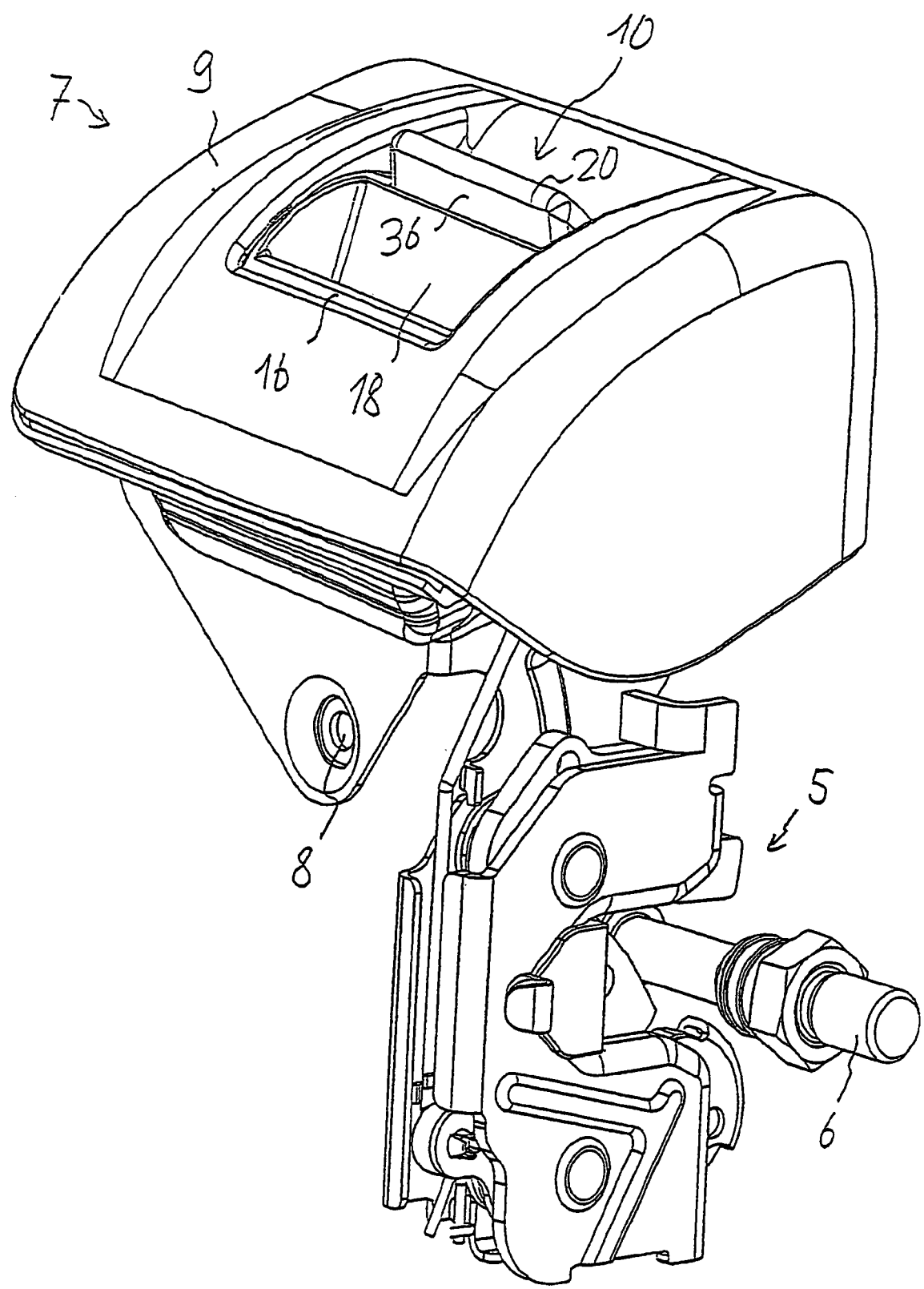
FIG. 6 is a representation corresponding to FIG. 2 and FIG. 4, with opened lock.
Figure 9:
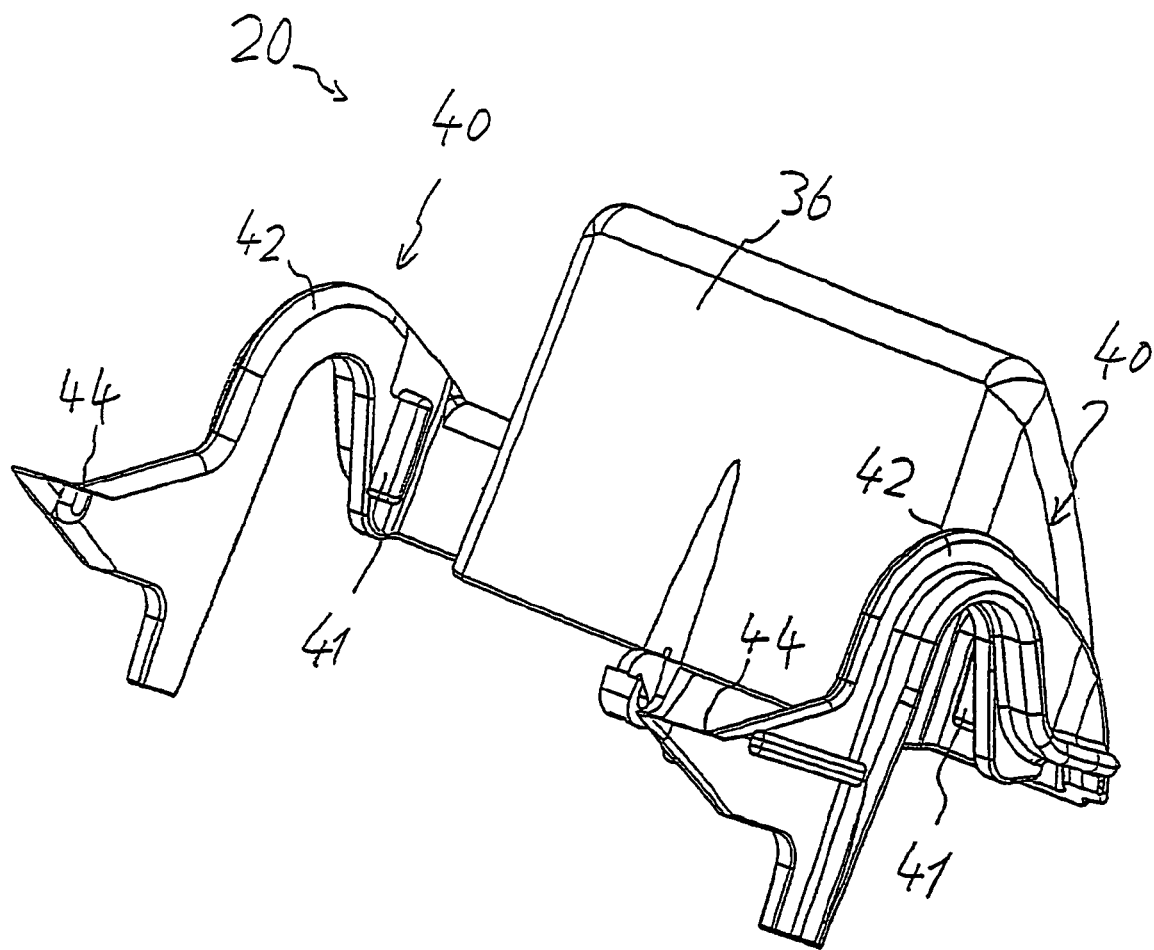
FIG. 9 is a perspective view of the warning indicator.
Figure 10:
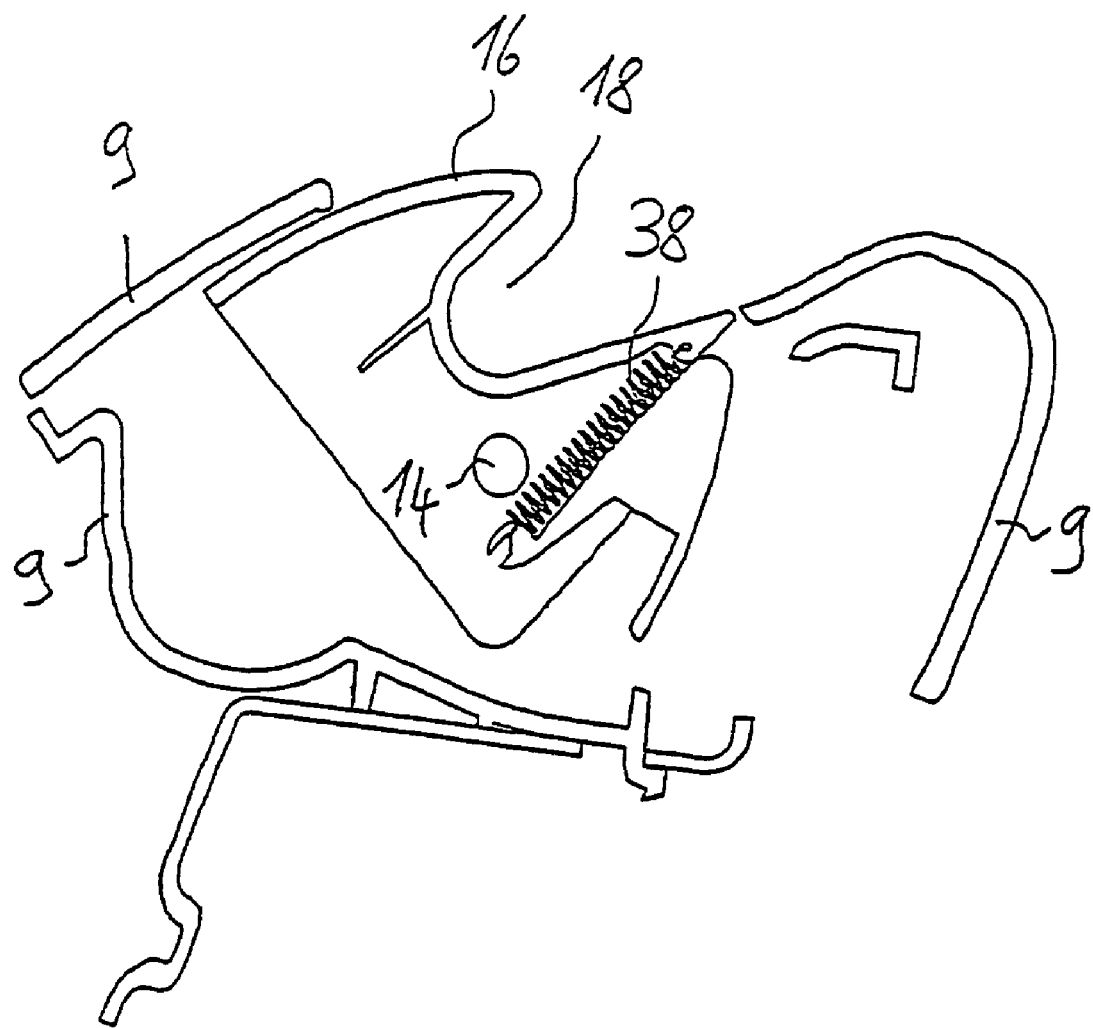
FIG. 10 is the section A—A from FIG. 2.

As shown in FIG. 9, in particular, the warning indicator 20 exhibits two symmetrical side areas 40, in each of which a spring area 41, an arc area 42 contiguous to the spring area 41 and a guiding curve are provided. The side portions 40 are curved so as to not block the pivot movements of handle 16. The spring areas 41 of the two side areas 40 are guided in the guide grooves 19 of handle 16. In this way, a spring/groove engagement is created on both sides of the indicator area 36, enabling a one-dimensional guidance of the warning indicator 20. Furthermore, upon the pivoting of handle 16, the warning indicator 20 slides along the pivot axis bolt 14, as shown in FIGS. 3, 5 and 7, thereby preventing the warning indicator 20 from tilting.

Due to the pre-loading of the spring 38, the warning indicator 20 is pushed in the respective uppermost position. In the non-actuated position shown in FIGS. 2 and 3, the uppermost position of the warning indicator is defined by the contact of a front point of its guiding curves 44 on the steering pin 12. In this position, the warning indicator 20 is completely concealed behind handle 16 and is thus not visible.

Figure 2:
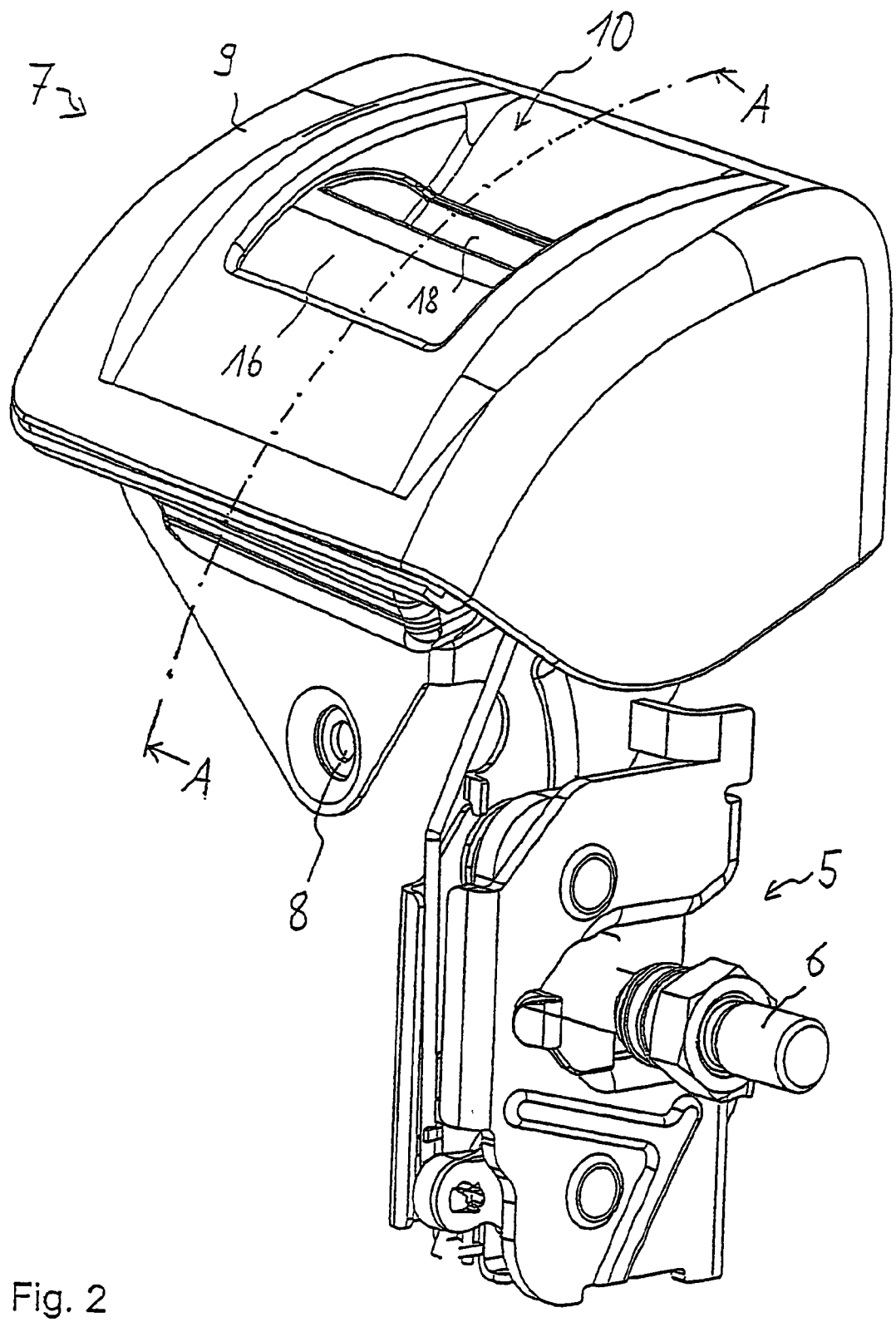
FIG. 2 shows the lock and the release device in FIG. 1 in the closed state.
Figure 4:
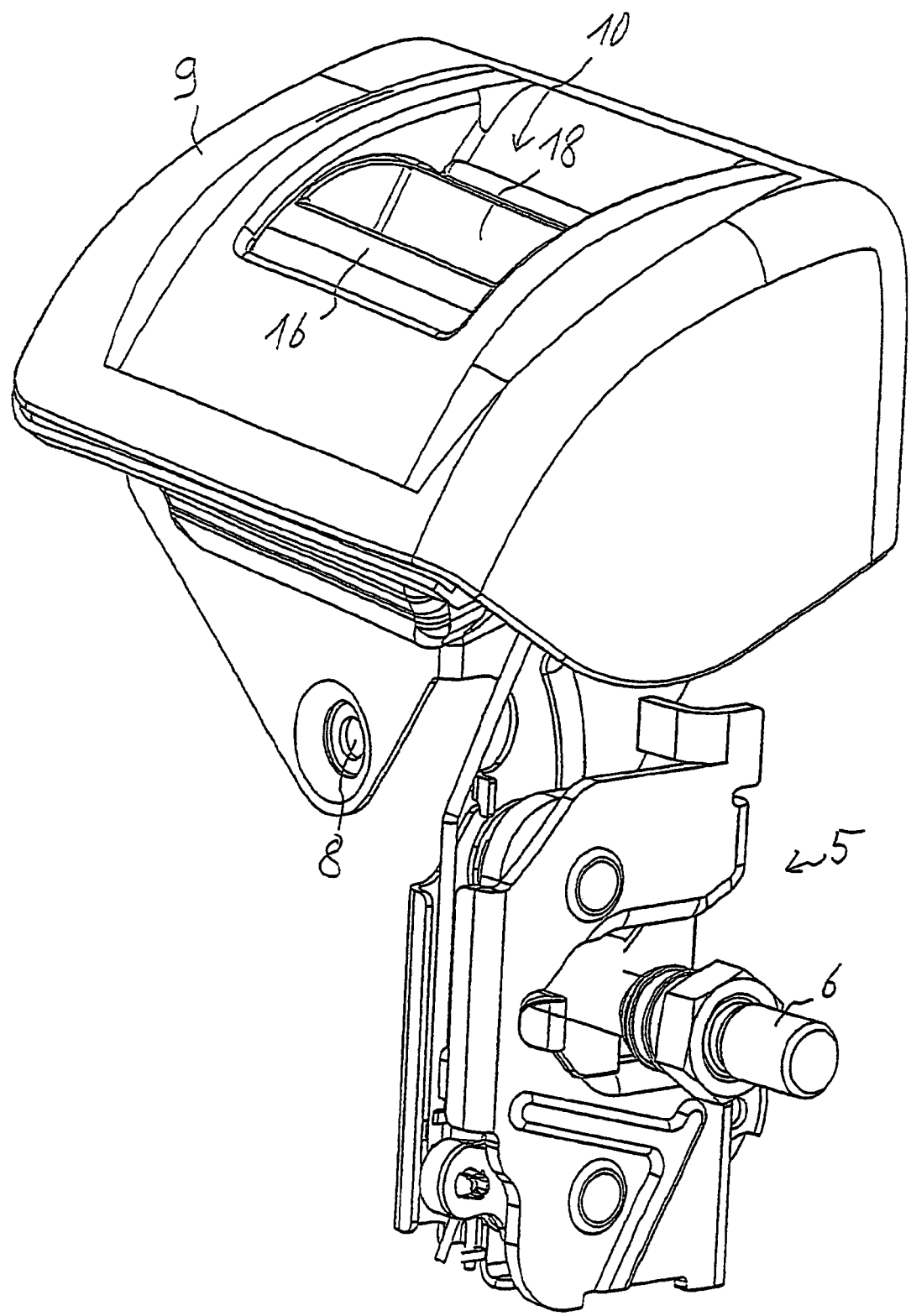
FIG. 4 is a representation corresponding to FIG. 2, with a slightly opened lock.

Starting with the locked position shown in FIGS. 2 and 3, the user actuates handle 16 for release purposes, by gripping the recessed grip 18 and pivoting handle 16 forward, i.e. as shown in FIG. 3, abound the pivot axis bolt 14 to the left. The transfer bar 22 is hereby pulled backwards and upwards, still holding the rotary latch 26 in the partially actuated position shown in FIGS. 4 and 5. During its pivot movement, handle 16 pivoting forward carries with it the warning indicator 20 guided thereon.

As a result of the pivot movement of handle 16, its relative position with respect to the housing-fixed steering pin 12 changes. Since the position of the warning indicator 20 is determined by the spring-preloaded contact of its guiding curve 44 on the housing-fixed steering pin 12, the warning indicator 20 slides upward in the guide 19 of handle 16 and on the pivot axis bolt 14. Here, the guiding curves 44 slide on or roll off the steering pin 12. In the position shown in FIGS. 3 and 4, the indicator area 36 is not yet visible.

Upon further pivoting forward, handle 16 is fully actuated, causing the transfer bar 22 to pull the pawl 30 to such an extent that the latter releases the protrusion 34 of the rotary latch 26, subsequently allowing the chassis-fixed bolt 6 to come out of the mouth 27 of the rotary latch when rear seat backrest component 1 is folded forward. As shown in FIG. 7, as a result of its spring preloading, the rotary latch 26 is kept in its opened position, where the pawl 30 rests on the left leg 45 of the rotary latch 26. This contact of the pawl 30 on the left leg 45 prevents the return of handle 16 into the non-actuated position, as shown in FIGS. 2 and 3, due to its spring preloading. While the tension of tension spring 38 is released, the warning indicator 20 reaches its uppermost position in the guide groove 19 of handle 16, in which the indicator area 36 appears, clearly visible to the user, behind handle 16 and indicates, through its red color, the actuated position of handle 16 and thus the non-existing lock of the chassis-fixed bolt 6 in the rotary latch 26.

In accordance with FIG. 7, the uppermost position of the warning indicator 20 is capable of being determined by the contact of guiding curve 44 on steering pin 12. At variance with this account, it is also possible for the warning indicator 20 to have already arrived at the upper stop of the guide 19 of handle 16, so that any further pivoting forward will cause guiding curve 44 to pivot downward and away from steering pin 12.

Handle 16 remains in the actuated position and warning indicator 20 in the advanced position, until, when the rear seat backrest component 1 is folded back, the chassis-fixed bolt 6 again end up in the mouth 27 of rotary latch 26 and pivots it, causing pawl 30 to lock it, while the tension of the spring of handle 16 is being released, and causing handle 16 to again assume the position shown in FIG. 2, 3.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A release device for a rear seat backrest component of a vehicle seat, comprising a housing to be attached to the foldable rear seat backrest component, a handle designed for actuation by the user, a transfer means, connected with said handle, for release of a lock which locks the rear seat backrest component; and a warning indicator with an indicator area to indicate the unlocked state of said lock, wherein said warning indicator is in a pulled-back position in the non-actuated position of said handle and in a pushed-forward position in the actuated position of said handle, said handle has a pivot area and is pivotably mounted in the housing, and said handle includes a guide, in which said warning indicator is movably guided and is preloaded by a spring in an upper position of its displacement path, characterized in that said housing includes a steering area and said warning indicator has an upper position and includes a guiding curve for contact to said steering area, and the upper position of said warning indicator is determined at least in one portion of the pivot area of said handle by the contact of the guiding curve to said steering area.

2. The release device according to claim 1, characterized in that the indicator area of said warning indicator protrudes behind the handle in the pushed-forward position.

3. The release device according to claim 2, characterized in that the housing has a recess to accommodate said handle, with said warning indicator being accommodated in the recess behind said handle in the pivoted-back position of said handle.

4. The release device according to claim 1, characterized in that at least one of the guides of said handle for said warning indicator is linear.

5. The release device according to claim 1, characterized in that said steering area is a steering pin extending in the transverse direction.

6. The release device according to claim 1, characterized in that said warning indicator exhibits two side areas, each having a guiding curve.

7. The release device according to claim 1, characterized in that, upon forward pivoting of said handle, said guiding curve slides along said steering area.

8. The release device according to claim 1, characterized in that, upon forward pivoting of said handle, said warning indicator slides along a pivot axis bolt forming the pivot axis of said handle.

9. The release device according to claim 1, characterized in that said guiding curve and said steering area are positioned in front of the pivot axis of said handle.

10. The release device according to claim 1, characterized in that said transfer means is a transfer bar connected to said handle, said transfer bar designed to actuate a pawl of lock.

11. The release device according to claim 1, characterized in that said warning indicator is made from a different type of material than the material of said handle, e.g. having a different color.

12. The release device according to claim 1, characterized in that, upon forward pivoting of said handle, said warning indicator is moved into the pushed-forward position while the tension of said spring is released.

13. The release device according to claim 1, characterized in that, upon forward pivoting of said handle, the warning indicator slides in the guide of said handle.

* * * * *